US011238663B1

(12) United States Patent
Guckenberger et al.

(10) Patent No.: US 11,238,663 B1
(45) Date of Patent: Feb. 1, 2022

(54) MINI-MAPS WITH GAZE GUIDANCE LINES VISUALIZATION MODULE PROCESS AND DEVICE

(71) Applicant: VR REHAB, INC., Clermont, FL (US)

(72) Inventors: Elizabeth T. Guckenberger, Clermont, FL (US); Ronald J. Guckenberger, Clermont, FL (US)

(73) Assignee: VR REHAB, INC., Clermont, FL (US)

( * ) Notice: Subject to any disclaimer, the term of this patent is extended or adjusted under 35 U.S.C. 154(b) by 0 days.

(21) Appl. No.: 17/062,218

(22) Filed: Oct. 2, 2020

Related U.S. Application Data

(60) Provisional application No. 62/909,497, filed on Oct. 2, 2019.

(51) Int. Cl.
*G06T 19/00* (2011.01)
*G06T 11/00* (2006.01)

(52) U.S. Cl.
CPC ............ *G06T 19/006* (2013.01); *G06T 11/00* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 2005/0234323 A1* | 10/2005 | Kayahara | G06T 7/00 600/407 |
| 2006/0271284 A1* | 11/2006 | Watanabe | G01C 21/367 701/431 |
| 2014/0063058 A1* | 3/2014 | Fialho | G06T 19/00 345/633 |
| 2019/0104254 A1* | 4/2019 | Cha | G06T 3/0018 |

OTHER PUBLICATIONS

Bork et al., Birds vs. Fish: Visualizing Out-Of-View Objects in Augmented Reality using 3D Minimaps, Oct. 2019, IEEE, 285-286 (Year: 2019).*

* cited by examiner

*Primary Examiner* — Robert J Craddock
(74) *Attorney, Agent, or Firm* — James H. Beusse, Esquire; Beusse Sanks, PLLC

(57) ABSTRACT

Mini-Map with Gaze Guidance Line Visualization Module enables new types and classes of Human Computer Interface enhancements where the Humans can easily and simultaneously see where objects are relative within a 2D map in the foreground connected via intuitive gaze guidance lines to the same object with the Augmented Reality view. The Mini-Map is fully manipulatable position, zoom, display angle with defaults being relative to the user.

11 Claims, 4 Drawing Sheets

MINI-MAPS WITH GAZE GUIDANCE LINES VISUALIZATION MODULE PROCESS AND DEVICE

CROSS-REFERENCE TO RELATED APPLICATIONS

This application which claims the benefit of U.S. Provisional Application No. 62/909,497 filed Oct. 2, 2019, the entirety of which is incorporated by reference.

STATEMENT REGARDING FEDERALLY SPONSORED RESEARCH OR DEVELOPMENT

The United States government has rights under this invention pursuant to U.S. Contract No. W911QY16C0155 entitled Augmented Reality User Interfaces for Tactical Drones.

BACKGROUND OF THE INVENTION

This invention generally relates to enhancement of Human Computer Interfaces and Augmented/Mixed Realities Situational Awareness, specifically to providing a Mini-Map inset along with Gaze Guidance Lines to simultaneously view the same object on the map to the same object within the Augmented Reality view.

For example, current augmented reality graphics require looking at a different device for the map view or a Mini-Map NOT linked to the AR view. Our default implementation includes a Gaze Guidance Line to visually connect/link the target object in the AR view to the Mini-Map inset. Users are able to simultaneously view the real-world target area of interest through the AR-HMD, plus the Mini-Map inset.

This invention is not limited to just military applications, this invention applies to AR and map/terrain/surfaces processes in general, such as any 3D graphics that have corresponding 2D representations, etc.

Applicants are not aware of any prior art show of useful augmented reality (AR) applications that visually link the same objects that are highlighted or annotated with AR graphics with corresponding 2D maps. It is not believed that the prior art includes associated AR views of a target object/area of interest with AR graphics added and a gaze guidance line to link the Mini-Map view of the same area.

BRIEF SUMMARY OF THE INVENTION

The present invention is directed to Human Computer Interface enhancements where Human operators can easily and simultaneously see the overhead view of a target area of interest from above as a picture in a picture inset, as well as through the AR display (optical or video see-through), along with an intuitive gaze guidance line linking the two.

In one implementation, users are able to simultaneously view the real-world target area of interest through the AR-HMD, plus the Mini-Map inset. The default implementation Mini-Map moves with the user in position and orientations plus includes additional capabilities such as (but not limited to):

Adding a military type 2525 Icon to the Mini-Map and the Gaze Guidance Line automatically draws and 'at a glance' also shows the same military 2525 type Icon in the Real-World through the AR display;

The opposite is also true Adding a military 2525 type Icon to the RealWorld as seen through the AR display and the Gaze Guidance Line automatically draws and 'at a glance' also shows the same military 2525 type Icon in the Mini-Map display area;

Another embodiment adds a drone automatically flying to the overhead position in the real-world to provide real-time video of the AR safety circle or ring and definitively shows all entities are within or outside of the safety circle.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION OF THE INVENTION

Figure 1:
FIG. 1 is a Screen Capture from FAR-UI implementation for OSD/Army project.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Referring to FIG. 1, there is shown a screen capture of Instant SA application for our OSD Army project providing our new Mini-Map with Gaze Guidance Lines visualization innovations in the context of enhancing military personnel's situational awareness of a target area. The Drone video feed is the central picture in a picture inset 1000 and displays a 3D real-time real-world perspective 3D view of a selected portion of the real-world, which is loosely corelated (indicated at 1100) with the surrounding MapBox or other similar synthetic vision terrain data source. Items 1200 are military type 2525 Icons inserted from a separate blue/red force tracker data sources for SA benefits. In the foreground, item 1300 is a MiniMap inset for 2D, 2.5D, and/or 3D viewing for overall situational awareness that also connects via Gaze Guidance Lines 1400 (yellow lines within image) the same position or object within the MiniMap with the real-world. In this figure the lines 1400 are connecting same red force 2525 type icons 1600 (overlaid on top of 1000) and icons 1700 (overlaid on top of item 1300). The use of Gaze Guidance Lines 1400 reduces users' cognitive workload doing mental transforms between the different dimensional representations and reduces time to perform tasks and reduces errors.

Figure 2:
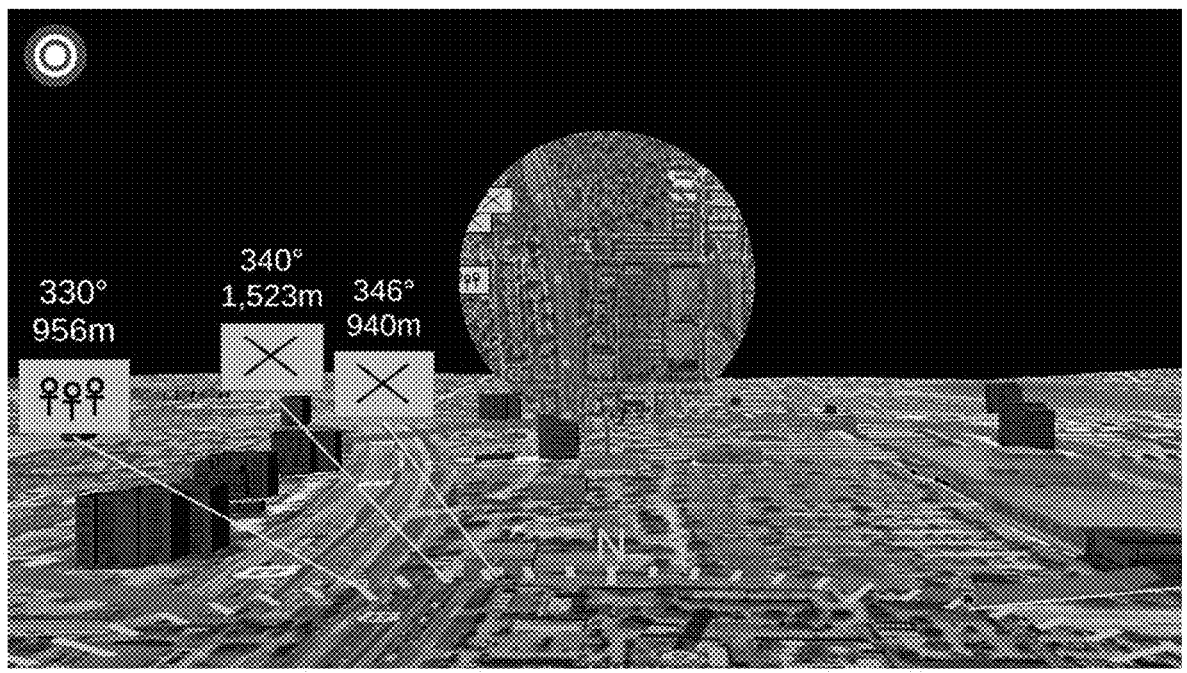
FIG. 2 is a screen capture MiniMap with Gaze Guidance Lines visualization innovations in the context of enhancing military personnel's situational awareness of a target area.

Turning to FIG. 2 there is shown a screen capture Mini-Map with Gaze Guidance Lines visualization innovations in the context of enhancing military personnel's situational awareness of a target area. The Instant SA picture in a picture inset 500 displays an overhead view of a selected portion of the world, using MapBox or other similar data source. Inset 500 is intuitively visually connected to the center point of the desired area to be display by flagpole 570 which is just a line that visually links inset 500 to the terrain. Insets 550 and 555 are two different views of the same augmented reality graphic for a munition splash zone that depicts the Risk Estimation Distance (RED=safety distance to stay out for a specific munition's explosion). Inset 550 is the overhead view of the splash zone such that the warfighter can clearly see items that are in or out of the zone. Inset 555 shows the 3D perspective view of the splash zone which is more difficult and error prone to see what is in and out of the zone. Inset 510 shows military 2525 type Icons inserted from a separate blue force tracker data source so the friendlies can be judged inside or outside of the splash zone to avoid fratricides. Inset 560 is a MiniMap inset for 2D, 2.5D, and/or 3D viewing for overall situational awareness that also connects via Gaze Guidance Lines 530 (yellow lines within image) the same position or object within the MiniMap with the real-world. The use of Gaze Guidance Lines 530 reduces users' cognitive workload doing mental transforms between the different dimensional representations and reduces time to perform tasks and reduces errors.

Figure 3:
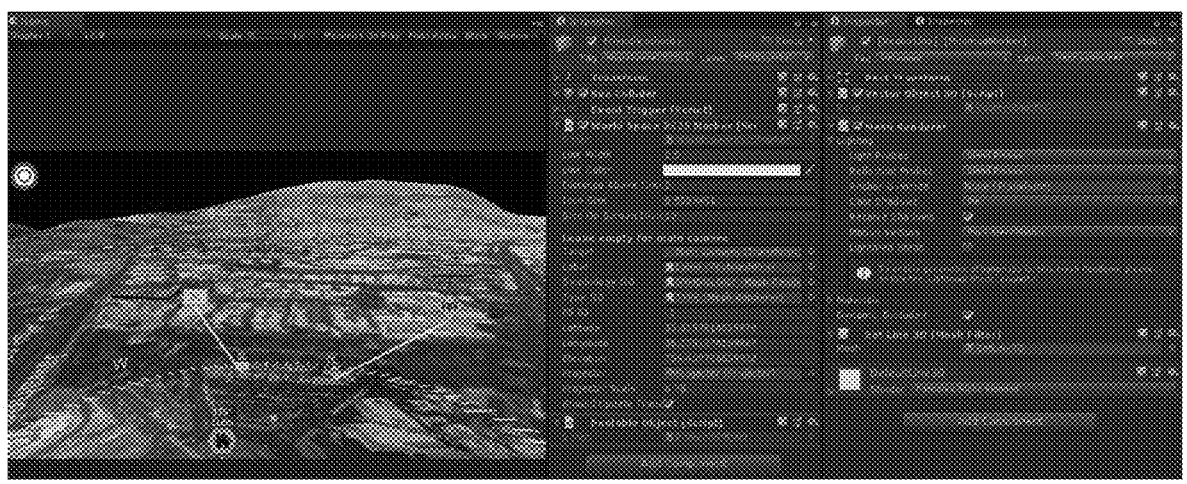
FIG. 3 illustrates Minimap_GazeLines_Unity_Components in Unity3D editor.
Figure 4:
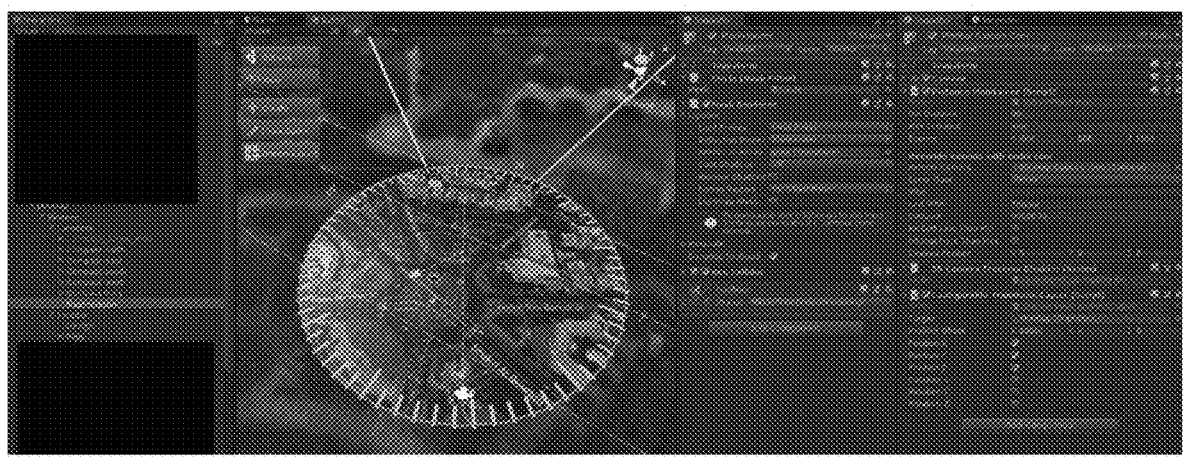
FIG. 4 illustrates Minimap_Unity_Components shown in Unity3D editor.

FIGS. 3 and 4 illustrate Minimap_GazeLines_Unity_Components and Minimap_Unity_Components respectively as the appear in a Unity3D editor.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A method for enhancing visual situational awareness in a field of view on an electronic display device, comprising the steps of:
   providing a real-world view of a geographical area forward of the location of the display device on a screen of the display device;
   indicating a geographical location of a predetermined area on the display device;
   creating an inset on the display device of a mini-map of the predetermined area; and
   creating and displaying a set of gaze guidance lines from specific locations in the predetermined area to objects on the mini-map corresponding to objects in the real world view to enhance situational awareness by the user of the display device.

2. The method of claim 1, wherein the gaze guidance lines originate from the mini-map and extend from selected objects in the mini-map to corresponding objects in the real world view.

3. The method of claim 1, wherein the mini-map provides an enlarged field of view compared to the field of view on the electronic display device so that the user has a larger field of view of the predetermined area for enhanced situational awareness.

4. The method of claim 1, wherein the gaze guidance lines intuitively visually link the same objects within the mini-map to the same objects within the field of view on the electronic display device.

5. The method of claim 1, wherein the objects in the predetermined area are beyond the field of view of the display device and the gaze guidance lines are created to extend off an edge of the display screen of the display device in alignment with the location of the objects.

6. The method of claim 1, wherein the mini-map provides a smaller field of view than the field of view on the electronic display device so that the gaze guidance lines direct the user's eyes toward the predetermined area.

7. The method of claim 1, and including projection of a perimeter of the predetermined area on the real world view of the geographical area.

8. The method of claim 7, wherein the predetermined area comprises a military target and the projected perimeter defines an area that would be impacted by ordnance exploding on a selected object within the predetermined area.

9. The method of claim 8, wherein ordnance is being directed at the target from locations other than the location of the user of the display device and including gaze guidance lines extending from the mini-map toward the source of the ordnance.

10. A method of enhancing visual situational awareness in a field of view on an electronic display device, comprising the steps of:
    providing a real-world view of a geographical area forward of the location of the display device on a screen of the display device;
    indicating a geographical location of a predetermined area on the display device;
    creating an inset on the display device of a mini-map of the predetermined area; and
    creating and displaying a set of gaze guidance lines from moving objects in the real-world view of a geographical area forward of the location of the display device to representations of the same objects on the mini-map corresponding to the moving object's locations to enhance situational awareness by the user of the display device.

11. A method of enhancing visual situational awareness in a field of view on an electronic display device, comprising the steps of:
    providing a real-world view of a geographical area forward of the location of the display device on a screen of the display device;
    indicating a geographical location of a predetermined area on the display device;
    creating an inset on the display device of a mini-map of the predetermined area; and
    creating and displaying a set of gaze guidance lines from moving objects on the mini-map to moving objects within the real-world view of a geographical area forward of the location of the display device corresponding to the specific locations to enhance situational awareness by the user of the display device.

\* \* \* \* \*